(12) United States Patent
Moon et al.

(10) Patent No.: US 8,191,516 B2
(45) Date of Patent: Jun. 5, 2012

(54) DELAYED EXHAUST ENGINE CYCLE

(75) Inventors: Joseph J. Moon, Clawson, MI (US); Roberto L Rastelli, Farmington, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 600 days.

(21) Appl. No.: 12/400,312

(22) Filed: Mar. 9, 2009

(65) Prior Publication Data

US 2010/0224151 A1    Sep. 9, 2010

(51) Int. Cl.
     *F02B 75/02*      (2006.01)
(52) U.S. Cl. .................. 123/64; 123/311; 123/198 F
(58) Field of Classification Search .............. 123/64, 123/311, 198 F, 21, 179.21, 316, 65 PE, 65 P, 123/193.3, 37, 90.11
See application file for complete search history.

(56) References Cited

U.S. PATENT DOCUMENTS

| | | | |
|---|---|---|---|
| 3,964,263 A * | 6/1976 | Tibbs ........................ | 123/25 C |
| 4,641,613 A * | 2/1987 | Delesalle ................. | 123/179.21 |
| 4,805,571 A * | 2/1989 | Humphrey .................. | 123/316 |
| 4,892,067 A | 1/1990 | Paul et al. | |
| 4,930,465 A | 6/1990 | Wakeman et al. | |
| 5,154,143 A | 10/1992 | Stutzenberger | |
| 5,588,402 A * | 12/1996 | Lawrence ................. | 123/65 PE |
| 5,680,841 A | 10/1997 | Hu | |
| 5,732,677 A | 3/1998 | Baca | |
| 6,443,108 B1 | 9/2002 | Brehob et al. | |
| 6,918,358 B2 | 7/2005 | Hu | |
| 6,968,825 B2 * | 11/2005 | Hitomi et al. ............ | 123/406.11 |
| 7,079,941 B2 * | 7/2006 | Tetsuno et al. ................ | 701/112 |
| 7,624,709 B2 | 12/2009 | Cao | |
| 8,011,331 B2 | 9/2011 | Albertson et al. | |
| 2004/0173166 A1 * | 9/2004 | Kobayashi et al. ............. | 123/21 |

* cited by examiner

*Primary Examiner* — Noah Kamen
*Assistant Examiner* — Long T Tran
(74) *Attorney, Agent, or Firm* — Harness, Dickey & Pierce, P.L.C.

(57) ABSTRACT

A method of operating an engine in a delayed exhaust engine cycle may include opening an intake valve of the engine during a first stroke to form an intake stroke. The method may further include closing the intake valve and determining an engine operating temperature. The engine operating temperature may be compared to a predetermined temperature limit. A first fuel mass may be provided to the combustion chamber between an end portion of a second stroke and a beginning portion of a third stroke. The third stroke may form a first power stroke and the intake valve and an exhaust valve in communication with the combustion chamber may be closed during the second and third strokes. The exhaust valve may be maintained in a closed position during a fourth stroke when the engine operating temperature is less than the predetermined temperature limit.

20 Claims, 5 Drawing Sheets

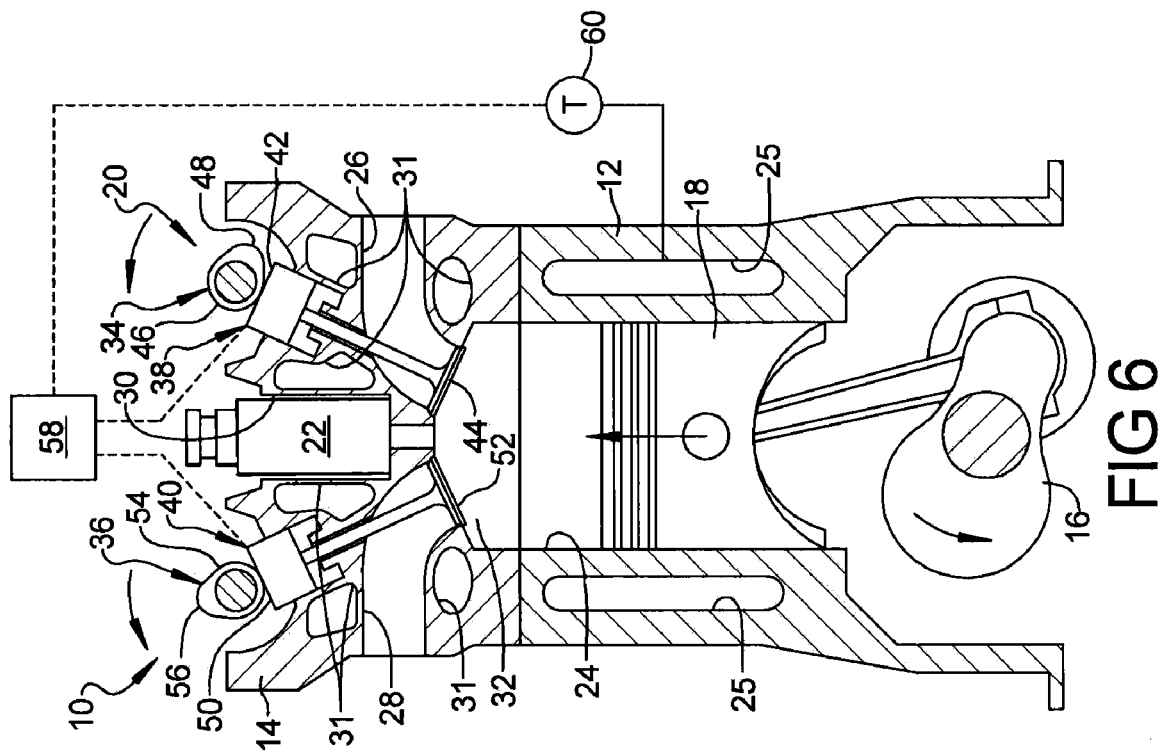
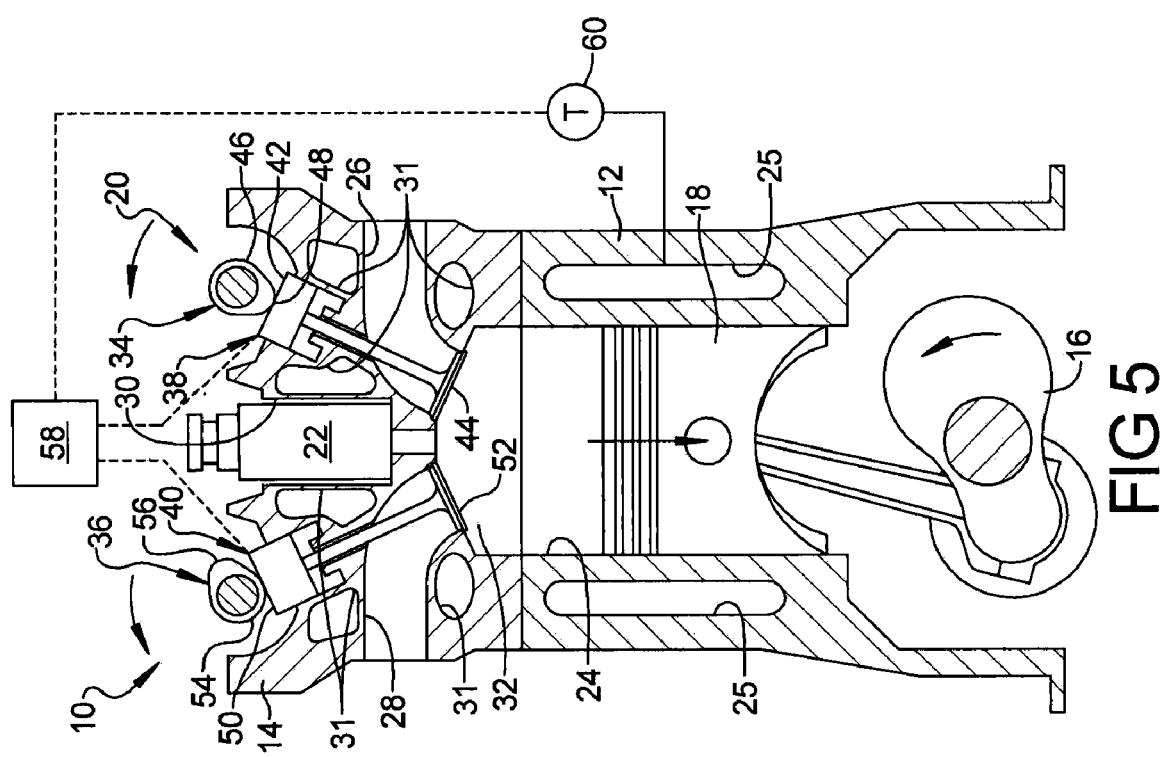

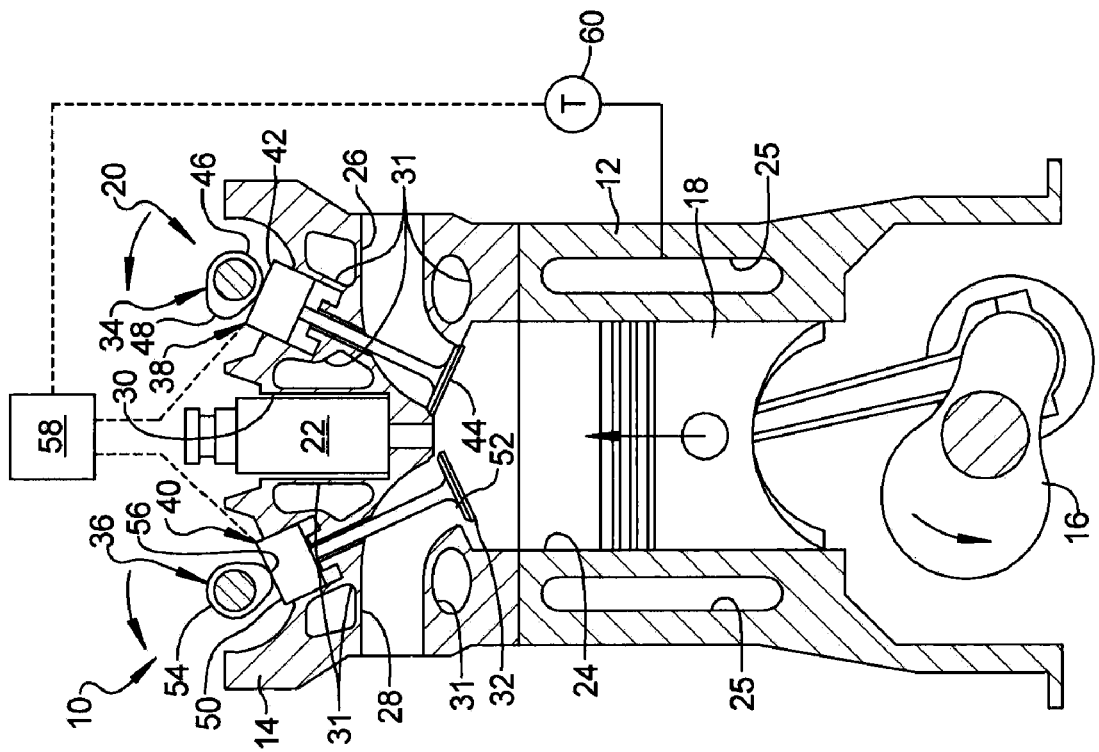
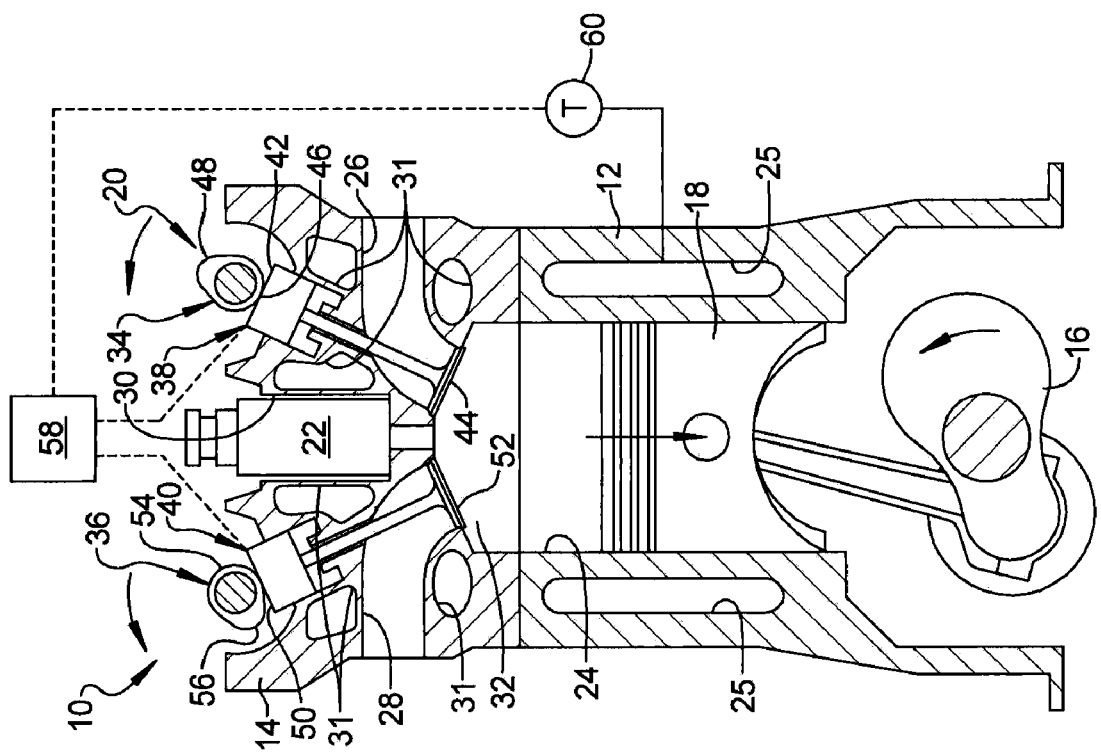

DELAYED EXHAUST ENGINE CYCLE

FIELD

The present disclosure relates to internal combustion engines, and more specifically to a delayed exhaust engine cycle for an internal combustion engine.

BACKGROUND

The statements in this section merely provide background information related to the present disclosure and may not constitute prior art.

Conventional engine operation includes a four stroke cycle. However, during light load conditions, residual oxygen levels in the combustion chamber may be sufficient for additional combustion events. This may be especially true for diesel applications, where the air flow provided to the intake port is unthrottled. Operating in a four stroke cycle during cold start conditions may extend warm-up times due to relatively cool in-cylinder temperatures. These relatively cool in-cylinder temperatures may provided limited heat transfer to engine coolant which is used for vehicle cabin heating and may also provide a relatively cool exhaust gas flow to exhaust aftertreatment components.

SUMMARY

A method of operating an engine in a delayed exhaust engine cycle may include opening an intake valve of the engine to provide an air flow to a combustion chamber of the engine defined by a cylinder bore and a piston disposed therein during a first stroke. The first stroke may form an intake stroke. The method may further include closing the intake valve and determining an engine operating temperature. The engine operating temperature may be compared to a predetermined temperature limit. A first fuel mass may be provided to the combustion chamber between an end portion of a second stroke immediately subsequent to the first stroke and a beginning portion of a third stroke immediately subsequent to the second stroke. The third stroke may form a first power stroke and the intake valve and an exhaust valve in communication with the combustion chamber may be closed during the second and third strokes. The exhaust valve may be maintained in a closed position during a fourth stroke immediately subsequent to the third stroke when the engine operating temperature is less than the predetermined temperature limit.

An alternate method of operating a diesel engine in a delayed exhaust engine cycle may include opening an intake valve of the diesel engine to provide an air flow to a combustion chamber of the diesel engine defined by a cylinder bore and a piston disposed therein during a first stroke. The first stroke may form an intake stroke. The method may further include closing the intake valve and maintaining the intake valve and an exhaust valve in communication with the combustion chamber in a closed position after the first stroke. The intake and exhaust valves may be maintained in the closed position during a second stroke immediately subsequent to the first stroke. The second stroke may form a first compression stroke. The intake and exhaust valves may be closed during a third stroke immediately subsequent to the second stroke. The intake and exhaust valves may be maintained in the closed position during a fourth stroke immediately subsequent to the third stroke, a fifth stroke immediately subsequent to the fourth stroke, and a sixth stroke immediately subsequent to the fifth stroke. The fourth stroke may form a second compression stroke and the sixth stroke may form a third compression stroke. The intake and exhaust valves may be closed during a seventh stroke immediately subsequent to the sixth stroke. A first fuel mass may be provided to the combustion chamber to form a first power stroke during one of the third and seventh strokes.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a schematic illustration of the engine assembly of FIG. 1 depicting another stroke of the delayed exhaust engine cycle;

FIG. 6 is a schematic illustration of the engine assembly of FIG. 1 depicting another stroke of the delayed exhaust engine cycle;

FIG. 7 is a schematic illustration of the engine assembly of FIG. 1 depicting another stroke of the delayed exhaust engine cycle;

FIG. 8 is a schematic illustration of the engine assembly of FIG. 1 depicting an exhaust stroke of the delayed exhaust engine cycle.

DETAILED DESCRIPTION

Figure 1:
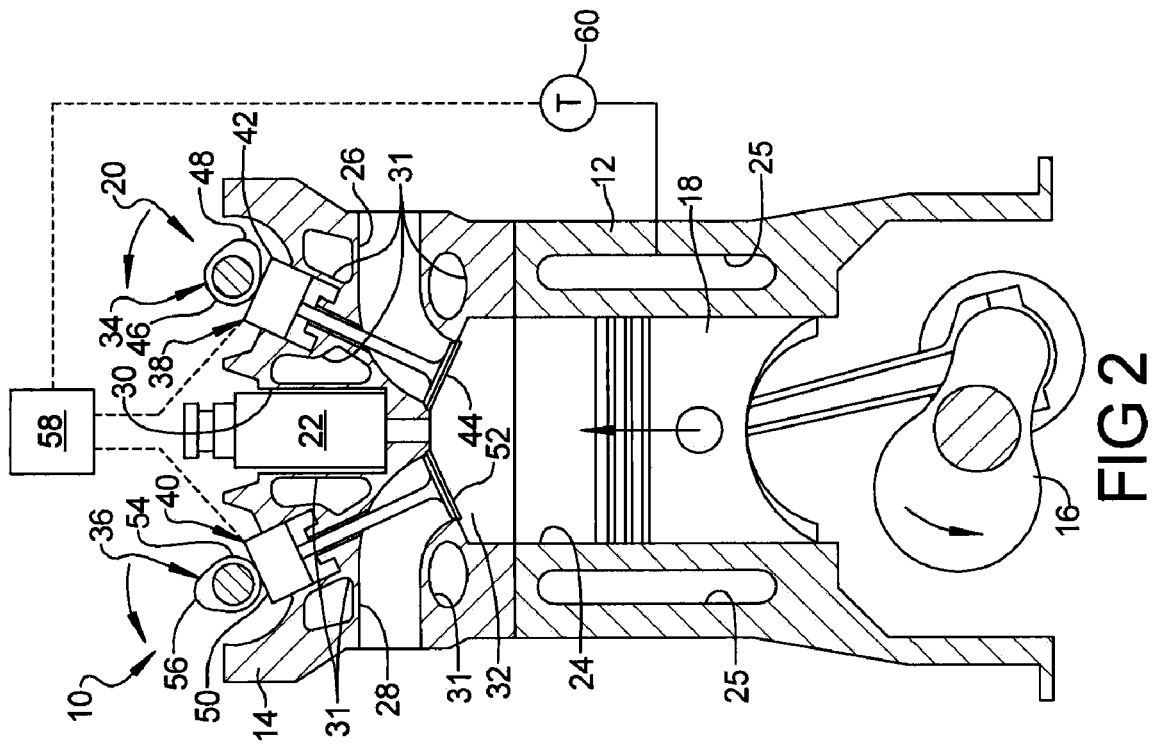
FIG. 1 is a schematic illustration of an engine assembly depicting an intake stroke of a delayed exhaust engine cycle according to the present disclosure.
Figure 2:
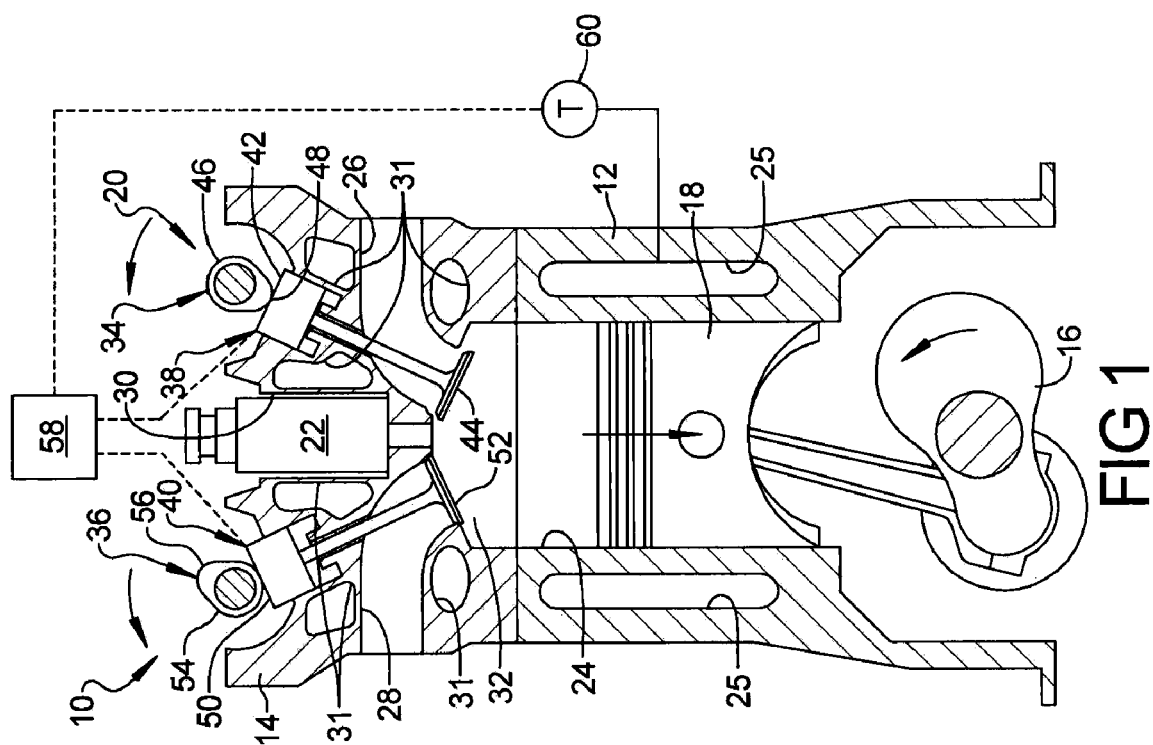
FIG. 2 is a schematic illustration of the engine assembly of FIG. 1 depicting another stroke of the delayed exhaust engine cycle.

The following description is merely exemplary in nature and is not intended to limit the present disclosure, application, or uses. It should be understood that throughout the drawings, corresponding reference numerals indicate like or corresponding parts and features.

As seen in FIGS. 1-8, an engine assembly 10 may include an engine block 12, a cylinder head 14, a crankshaft 16, pistons 18 (one of which is shown), a valvetrain assembly 20, a glow plug (not shown), and a fuel injector 22. The engine block 12 may define cylinder bores 24 (one of which is shown) each having a piston 18 disposed therein and coolant passages 25. It is understood that the present teachings apply to any number of piston-cylinder arrangements and a variety of engine configurations including, but not limited to, V-engines, inline engines, and horizontally opposed engines, as well as both overhead cam and cam-in-block configurations. Also, while illustrated with respect to a diesel engine, it is understood that the present disclosure additionally applies gasoline engines.

The cylinder head 14 may include intake and exhaust passages 26, 28, a fuel injector housing 30, and coolant passages

31. The engine block 12, cylinder head 14, and piston 18 may cooperate to define a combustion chamber 32. The fuel injector 22 may be located in the fuel injector housing 30, extending into and in communication with the combustion chamber 32, forming a direct injection configuration. The valvetrain assembly 20 may be supported by the cylinder head 14 and may include intake and exhaust camshafts 34, 36 and intake and exhaust valve assemblies 38, 40. The intake camshaft 34 may be engaged with the intake valve assembly 38 and the exhaust camshaft 36 may be engaged with the exhaust valve assembly 40.

The intake valve assembly 38 may include a valve displacement mechanism 42 and an intake valve 44. The valve displacement mechanism 42 may be engaged with the intake valve 44 and the intake camshaft 34 and may selectively transfer motion from the intake camshaft 34 to displace the intake valve 44 between open and closed positions. The valve displacement mechanism 42 may include a biasing member (not shown) that normally biases the intake valve 44 to the closed position and a valve lift mechanism (not shown) engaged with an intake lobe 46 of the intake camshaft 34.

The valve lift mechanism may be operable in first and second modes. In the first (or activated) mode, the valve lift mechanism may displace the intake valve 44 to the open position when engaged by a peak 48 of the lobe 46 (as seen in FIG. 1). In the second (or deactivated) mode, the valve lift mechanism may allow the intake valve 44 to remain in the closed position when engaged by the peak 48 of the lobe 46 (as seen in FIG. 5). The valve lift mechanism may include a variety of lost motion mechanisms operable in the first and second modes to selectively transfer motion between a camshaft lobe and a valve assembly. The valve lift mechanism may be actuated in a variety of manners including, but not limited to, hydraulic actuation.

The exhaust valve assembly 40 may include a valve displacement mechanism 50 and an exhaust valve 52. The valve displacement mechanism 50 may be engaged with the exhaust valve 52 and the exhaust camshaft 36 and may selectively transfer motion from the exhaust camshaft 36 to displace the exhaust valve 52 between opened and closed positions. The valve displacement mechanism 50 may include a biasing member (not shown) that normally biases the exhaust valve 52 to the closed position and a valve lift mechanism (not shown) engaged with an exhaust lobe 54 of the exhaust camshaft 36.

Figure 4:
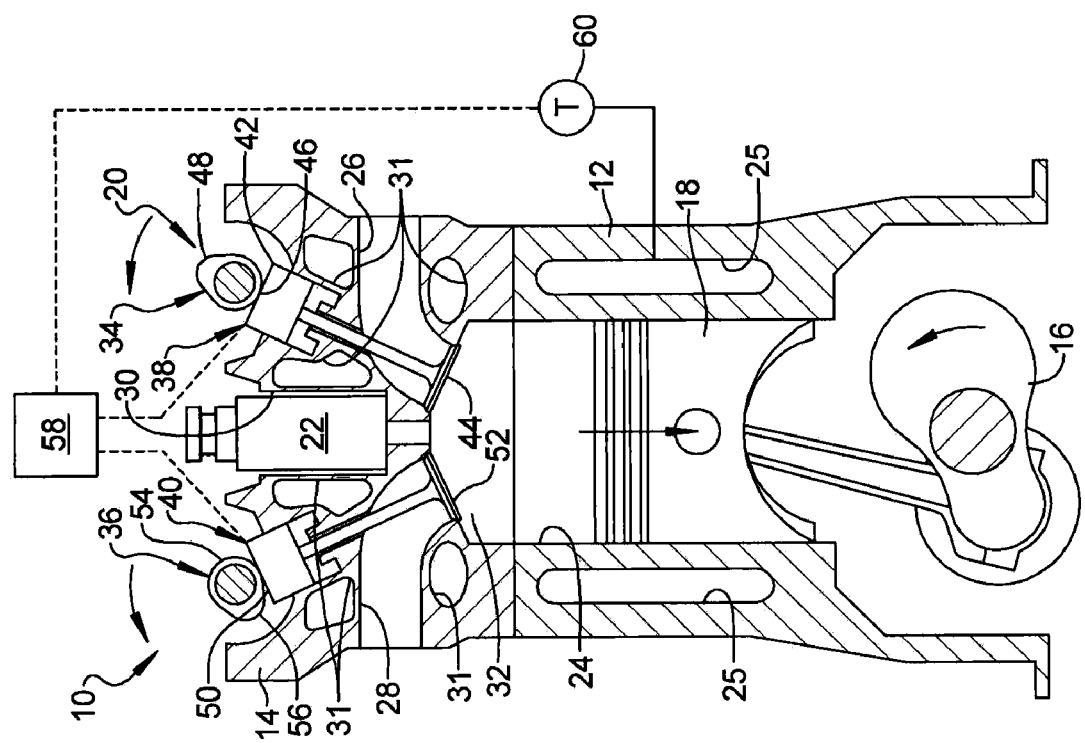
FIG. 4 is a schematic illustration of the engine assembly of FIG. 1 depicting another stroke of the delayed exhaust engine cycle.

The valve lift mechanism of the exhaust valve assembly 40 may be operable in the first and second modes as discussed above relative to the valve lift mechanism of the intake valve assembly 38. In the first mode, the valve lift mechanism may displace the exhaust valve 52 to the open position when engaged by a peak 56 of the lobe 54 (as seen in FIG. 8). In the second mode, the valve lift mechanism may allow the exhaust valve 52 to remain in the closed position when engaged by the peak 56 of the lobe 54 (as seen in FIG. 4). The valve lift mechanism may include a variety of lost motion mechanisms operable in first and second modes to selectively transfer motion between a camshaft lobe and a valve assembly. The valve lift mechanism may be actuated in a variety of manners including, but not limited to, hydraulic actuation. While shown as including a single intake valve 44, and a single exhaust valve 52, it is understood that any number of intake and exhaust valves may be used for a given cylinder 24.

The engine assembly 10 may additionally include a control module 58 and a temperature sensor 60 extending into one of the coolant passages 25, 31 and in communication with the control module 58. As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The temperature sensor 60 may provide a signal to the control module 58 indicative of the coolant temperature. The control module 58 may use the temperature to determine an engine operating temperature (T) and to control engine operation as discussed below.

Figure 9:
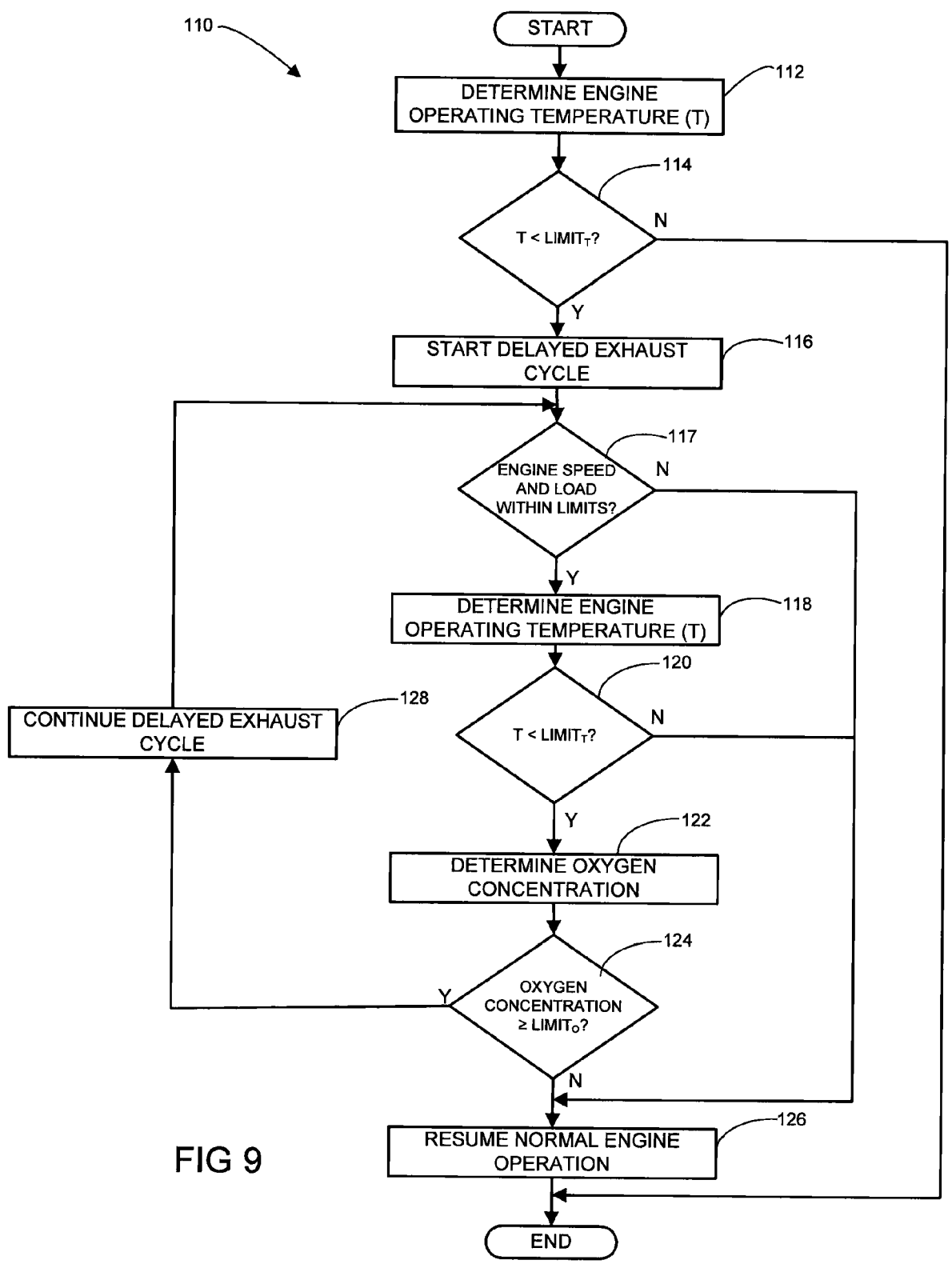
FIG. 9 is a flow diagram illustrating control of the engine assembly of FIGS. 1-8.

With reference to FIG. 9, control logic 110 is illustrated for control of engine operation in a delayed exhaust engine cycle. Control logic 110 may be used when engine operating speed is below a predetermined speed limit to allow sufficient time for valvetrain switching and when engine operating load is below a predetermined load limit where sufficient in-cylinder oxygen levels exist for multiple combustion events.

Control logic 110 may begin by determining the engine operating temperature (T) at block 112. Control logic 110 may then proceed to block 114 where the engine operating temperature (T) is evaluated. If the operating temperature (T) is at or above a predetermined temperature limit ($LIMIT_T$), control logic 110 may terminate. If the operating temperature (T) is below the predetermined temperature limit ($LIMIT_T$), control logic 110 may proceed to block 116 where the delayed exhaust engine cycle is started. A start of the delayed exhaust engine cycle may generally include operation of the valve lift mechanisms in the second (or deactivated) mode.

FIGS. 1-7 generally illustrate a non-limiting example of the start of the delayed exhaust engine cycle. Each engine stroke discussed below may correspond to approximately one-hundred and eighty degrees of rotation of the crankshaft 16 and ninety degrees of rotation of camshafts 34, 36. The intake and exhaust camshafts 34, 36 may each rotate at approximately one-half of the rotational speed of the crankshaft 16. As seen in FIG. 1, the first stroke of the delayed exhaust engine cycle may include an intake stroke. The first stroke may include the intake valve 44 being in the open position and the exhaust valve 52 being in the closed position. The valve lift mechanisms of the intake and exhaust valve assemblies 38, 40 may be operated in the first mode during the first stroke and may be switched to the second mode after the first stroke. The second stroke, seen in FIG. 2, may form a first compression stroke. The second stroke may be immediately subsequent to the first stroke and may include the intake and exhaust valves 44, 52 each being in the closed position.

Figure 3:
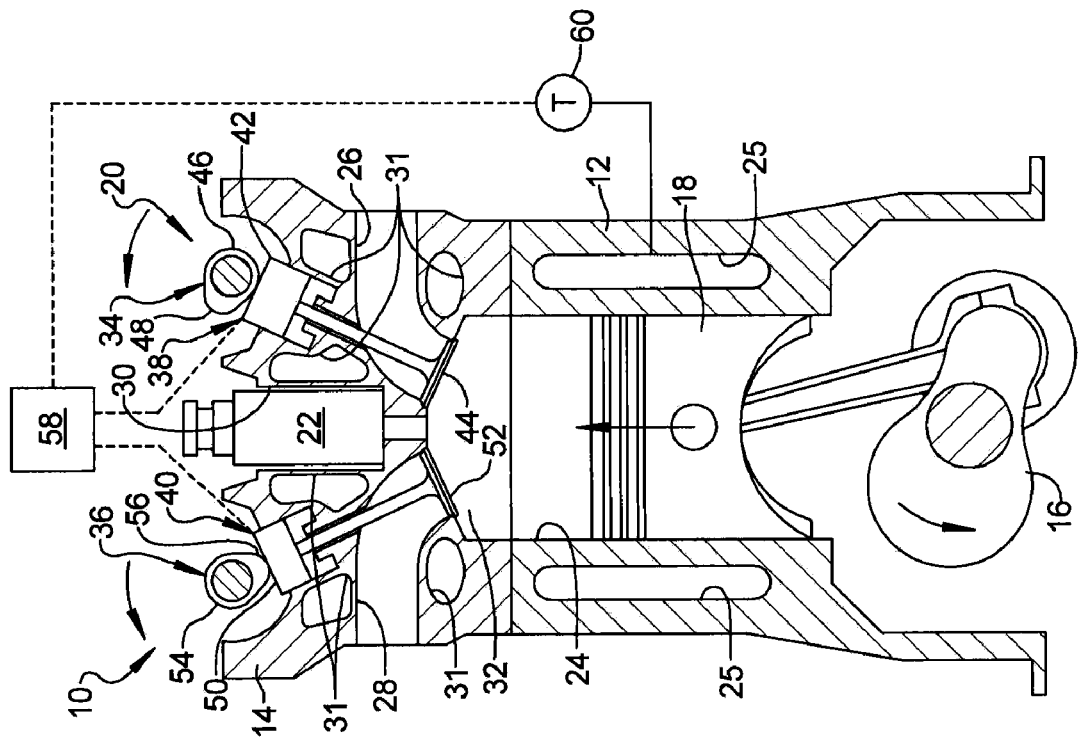
FIG. 3 is a schematic illustration of the engine assembly of FIG. 1 depicting another stroke of the delayed exhaust engine cycle.

As seen in FIG. 3, the third stroke may form a first expansion stroke. The third stroke may be immediately subsequent to the second stroke and may include the intake and exhaust valves 44, 52 each being in the closed position. A first fuel mass may be injected into the combustion chamber 32 between an end portion of the second stroke and a beginning portion of the third stroke. The third stroke may include a first power stroke where compressed air and the first fuel mass are ignited. The fourth stroke, seen in FIG. 4, may form a second compression stroke. The fourth stroke may be immediately subsequent to the third stroke and may include the intake and exhaust valves 44, 52 each being in the closed position.

As seen in FIG. 5, the fifth stroke may form a second expansion stroke. The fifth stroke may be immediately subsequent to the fourth stroke and may include the intake and exhaust valves 44, 52 each being in the closed position. The sixth stroke, seen in FIG. 6, may form a third compression stroke. The sixth stroke may be immediately subsequent to the fifth stroke and may include the intake and exhaust valves 44, 52 each being in the closed position.

As seen in FIG. 7, the seventh stroke may form a third expansion stroke. The seventh stroke may be immediately subsequent to the sixth stroke and may include the intake and exhaust valves 44, 52 each being in the closed position. A second fuel mass may be injected into the combustion chamber 32 between an end portion of the sixth stroke and a beginning portion of the seventh stroke. The seventh stroke may form a second power stroke where residual air compressed within the combustion chamber ignites the second fuel mass.

In an alternate arrangement, a first additional fuel mass may be injected into the combustion chamber 32 between an end portion of the fourth stroke and a beginning portion of the fifth stroke. In the alternate arrangement, the fifth stroke may form a first intermediate power stroke where compressed air and the first additional fuel mass are ignited.

After the delayed exhaust engine cycle has been started, the engine speed and load may be evaluated relative to the operating limits discussed above at block 117. If the engine speed and/or load are above the predetermined limits, control logic 110 may proceed to block 126 where normal operation is resumed. Otherwise, control logic 110 may proceed to block 118. The operating temperature (T) may be determined again at block 118 and then compared to the temperature limit ($LIMIT_T$) at block 120. If the operating temperature (T) is greater than or equal to the temperature limit ($LIMIT_T$), control logic 110 may proceed to block 126 where normal operation is resumed. Resumption of normal operation may generally include the valve lift mechanisms of the intake and exhaust valve assemblies 38, 40 being switched back to the first mode. Normal operation may include engine operation in the four stroke mode. By way of non-limiting example, the intake and exhaust valve assemblies 38, 40 may be switched back to the first mode at a point between the start of the sixth stroke and the end of the seventh stroke.

The next (or eighth) stroke, seen in FIG. 8, may then form an exhaust stroke. The eighth stroke may include the intake valve 44 being in the closed position and the exhaust valve 52 being in the open position. Exhaust gas may exit the combustion chamber 32 during the eighth stroke.

If the operating temperature (T) is less than the temperature limit ($LIMIT_T$), control logic 110 may proceed to block 122 where the oxygen concentration within the combustion chamber 32 is determined. Oxygen concentration may be estimated based on the mass of air taken in during the intake stroke and the fuel mass that was injected. For an initial combustion event, a predetermined air-fuel mixture may be known based on an engine load requirement. Additional combustion events may be controlled by varying the injected fuel mass to provide a predetermined air-fuel ratio prior to an exhaust event. Control logic 110 may then proceed to block 124 where the oxygen concentration is evaluated. The combustion chamber 32 may generally have sufficient oxygen concentration for numerous combustion cycles since the air flow provided to the intake passage 26 is typically unthrottled in diesel applications. However, if the oxygen concentration is below the predetermined oxygen limit ($LIMIT_O$), control logic 110 may proceed to block 126 where normal operation is resumed as described above. If the oxygen concentration is at or above the oxygen limit ($LIMIT_O$), control logic 110 may proceed to block 128 where the delayed exhaust engine cycle is continued.

Continuation of the delayed exhaust engine cycle may generally include maintaining the intake and exhaust valve lift mechanisms in the second (or deactivated) mode during the next four strokes. The eighth stroke may form a fifth compression stroke. The eighth stroke may be generally similar to the fourth stroke illustrated in FIG. 4. The eighth stroke may be immediately subsequent to the seventh stroke and may include the intake and exhaust valves 44, 52 each being in the closed position.

The ninth stroke may form a fourth expansion stroke. The ninth stroke may be generally similar to the fifth stroke illustrated in FIG. 5. The ninth stroke may be immediately subsequent to the eighth stroke and may include the intake and exhaust valves 44, 52 each being in the closed position. In the alternate arrangement discussed above, a second additional fuel mass may be injected into the combustion chamber 32 between an end portion of the eighth stroke and a beginning portion of the ninth stroke. In the alternate arrangement, the ninth stroke may form a second intermediate power stroke where compressed air and the second additional fuel mass are ignited. The tenth stroke may form a fifth compression stroke. The tenth stroke may be generally similar to the sixth stroke illustrated in FIG. 6. The tenth stroke may be immediately subsequent to the ninth stroke and may include the intake and exhaust valves 44, 52 each being in the closed position.

The eleventh stroke may form a fifth expansion stroke. The tenth stroke may be generally similar to the seventh stroke illustrated in FIG. 7. The eleventh stroke may be immediately subsequent to the tenth stroke and may include the intake and exhaust valves 44, 52 each being in the closed position. A third fuel mass may be injected into the combustion chamber 32 between an end portion of the tenth stroke and a beginning portion of the eleventh stroke. The eleventh stroke may form a third power stroke where residual air compressed within the combustion chamber 32 and the third fuel mass are ignited.

Control logic 110 may return to block 117 again after the continuation of the delayed exhaust engine cycle is initiated at block 128. Control logic 110 may continue operation in the delayed exhaust engine cycle while the engine is operating within the speed and load limits until the operating temperature (T) is less than the temperature limit ($LIMIT_T$) or until the oxygen concentration is below the oxygen limit ($LIMIT_O$). The delayed exhaust engine cycle may generally include engine cycles having at least eight strokes and multiples of four strokes (i.e., 8 stroke, 12 stroke, 16 stroke).

While the delayed exhaust engine cycle is described above as having at least two power strokes per eight strokes, it is understood that alternate arrangements exist where a single power stroke occurs per eight strokes. By way of non-limiting example, a single power stroke may occur on either the third or seventh stroke discussed above, while the other forms an expansion stroke.

The engine assembly 10 may be operated in the delayed exhaust engine cycle during cold engine operation at light load conditions. By way of non-limiting example, the engine assembly 10 may be operated in the delayed exhaust engine cycle at start-up conditions. Engine operation in the delayed exhaust engine cycle may provide faster engine, and therefore vehicle, warm-up. The delayed exhaust engine cycle may additionally assist in reducing the time needed for exhaust aftertreatment components to reach temperatures required for operation.

Specifically, the delayed exhaust engine cycle may generally create higher temperatures in the combustion chamber than would occur with a traditional four stroke cycle during similar operating conditions. These increased temperatures may provide higher exhaust gas temperatures and may also heat coolant disposed within the coolant passages 25, 31 in the engine block 12 and the cylinder head 14. The reduced engine warm-up times may also provide faster vehicle cabin heating as well as more efficient emission control through

What is claimed is:

1. A method comprising:
    opening an intake valve of an engine to provide an air flow to a combustion chamber of the engine defined by a cylinder bore and a piston disposed therein during a first stroke, the first stroke forming an intake stroke;
    closing the intake valve;
    determining an engine operating temperature;
    comparing the engine operating temperature to a predetermined temperature limit;
    providing a first fuel mass to the combustion chamber between an end portion of a second stroke immediately subsequent to the first stroke and a beginning portion of a third stroke immediately subsequent to the second stroke, the third stroke forming a first power stroke and the intake valve and an exhaust valve in communication with the combustion chamber being closed during the second and third strokes; and
    maintaining the exhaust valve in a closed position during a fourth stroke immediately subsequent to the third stroke when the engine operating temperature is less than the predetermined temperature limit to prevent exhaust gas from exiting the combustion chamber during the fourth stroke.

2. The method of claim 1, wherein the maintaining includes switching an exhaust valve lift mechanism to a deactivated mode to prevent an exhaust cam lobe engaged therewith from opening the exhaust valve.

3. The method of claim 1, further comprising maintaining the intake valve in a closed position during a fifth stroke immediately subsequent to the fourth stroke when the engine operating temperature is less than the predetermined temperature limit.

4. The method of claim 3, wherein the maintaining the intake valve in the closed position includes switching an intake valve lift mechanism to a deactivated mode to prevent an intake cam lobe engaged therewith from opening the intake valve.

5. The method of claim 1, further comprising opening the exhaust valve during the fourth stroke to form an exhaust stroke when the engine operating temperature is greater than the predetermined temperature limit.

6. The method of claim 1, further comprising determining an oxygen level in the combustion chamber, the exhaust valve being maintained in the closed position during the fourth stroke when the engine operating temperature is less than the predetermined temperature limit and when the oxygen level is greater than a predetermined oxygen limit.

7. The method of claim 1, wherein the maintaining includes maintaining the intake and exhaust valves in the closed position for at least seven consecutive strokes immediately subsequent to the first stroke when the engine operating temperature is less than the predetermined temperature limit.

8. A method comprising:
    opening an intake valve of a diesel engine to provide an air flow to a combustion chamber of the diesel engine defined by a cylinder bore and a piston disposed therein during a first stroke, the first stroke forming an intake stroke;
    closing the intake valve, maintaining the intake valve and an exhaust valve in communication with the combustion chamber in a closed position after the first stroke;
    maintaining the intake and exhaust valves in the closed position during a second stroke immediately subsequent to the first stroke, the second stroke forming a first compression stroke;
    maintaining the intake and exhaust valves being closed during a third stroke immediately subsequent to the second stroke;
    maintaining the intake and exhaust valves in the closed position during a fourth stroke immediately subsequent to the third stroke, the fourth stroke forming a second compression stroke, the exhaust valve being in the closed position preventing exhaust gas from exiting the combustion chamber during the fourth stroke;
    maintaining the intake and exhaust valves in the closed position during a fifth stroke immediately subsequent to the fourth stroke;
    maintaining the intake and exhaust valves in the closed position during a sixth stroke immediately subsequent to the fifth stroke, the sixth stroke forming a third compression stroke;
    maintaining the intake and exhaust valves being closed during a seventh stroke immediately subsequent to the sixth stroke; and
    providing a first fuel mass to the combustion chamber to form a first power stroke during one of the third and seventh strokes.

9. The method of claim 8, further comprising opening the exhaust valve during an eighth stroke immediately subsequent to the seventh stroke and forming an exhaust stroke.

10. The method of claim 8, wherein the first fuel mass is provided to the combustion chamber between an end portion of the second stroke and a beginning portion of a third stroke to form the first power stroke during the third stroke.

11. The method of claim 10, further comprising providing a second fuel mass to the combustion chamber between an end portion of the sixth stroke and a beginning portion of the seventh stroke to form a second power stroke during the seventh stroke.

12. The method of claim 11, further comprising providing a third fuel mass between an end portion of the sixth stroke and a beginning portion of a seventh stroke immediately subsequent to the sixth stroke, the seventh stroke forming an intermediate power stroke.

13. The method of claim 8, further comprising maintaining the intake and exhaust valves closed during an eighth stroke immediately subsequent to the seventh stroke, the eighth stroke forming a fourth compression stroke.

14. The method of claim 13, further comprising maintaining the intake and exhaust valves closed during a ninth stroke immediately subsequent to the eighth stroke, a tenth stroke immediately subsequent to the ninth stroke, and an eleventh stroke immediately subsequent to the tenth stroke, the tenth stroke forming a fifth compression stroke.

15. The method of claim 14, wherein the first fuel mass is provided to the combustion chamber between an end portion of the second stroke and a beginning portion of a third stroke to form the first power stroke during the third stroke, the method further comprising providing a second fuel mass to the combustion chamber between an end portion of the sixth stroke and a beginning portion of the seventh stroke to form a second power stroke during the seventh stroke and providing a third fuel mass to the combustion chamber between an end portion of the tenth stroke and a beginning portion of a eleventh stroke immediately subsequent to the tenth stroke, the eleventh stroke forming a third power stroke.

16. The method of claim 8, wherein the intake and exhaust valves are maintained in the closed position while an oxygen content within the combustion chamber is greater than a predetermined oxygen limit.

17. The method of claim 16, wherein a maximum oxygen content in the combustion chamber occurs immediately subsequent to the intake stroke.

18. The method of claim 16, wherein the intake and exhaust valves are maintained in a closed position while an engine operating temperature is less than a predetermined temperature limit.

19. The method of claim 8, wherein the maintaining the intake and exhaust valves in the closed position includes placing intake and exhaust valve lift mechanisms in a deactivated mode preventing opening of the intake and exhaust valves by intake and exhaust cam lobes associated therewith.

20. The method of claim 19, further comprising switching the intake and exhaust valve lift mechanisms to an activated mode allowing opening of the intake and exhaust valves by the intake and exhaust cam lobes associated therewith, the intake and exhaust valves each being opened once per four consecutive strokes during the activated mode.

* * * * *